(12) United States Patent
Uecker

(10) Patent No.: US 12,090,585 B2
(45) Date of Patent: Sep. 17, 2024

(54) SYSTEMS AND METHODS FOR AUTOMATED CLEANING OF WIRE ELECTRODES AFTER WELDING

(71) Applicant: Illinois Tool Works Inc., Glenview, IL (US)

(72) Inventor: James Lee Uecker, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/867,095

(22) Filed: Jul. 18, 2022

(65) Prior Publication Data

US 2022/0347785 A1 Nov. 3, 2022

Related U.S. Application Data

(63) Continuation of application No. 16/399,347, filed on Apr. 30, 2019, now Pat. No. 11,420,285.

(51) Int. Cl.
*B23K 9/32* (2006.01)
*B23K 9/095* (2006.01)
(Continued)

(52) U.S. Cl.
CPC .............. *B23K 9/328* (2013.01); *B23K 9/095* (2013.01); *B23K 9/1043* (2013.01); *B23K 9/125* (2013.01); *B23K 9/133* (2013.01)

(58) Field of Classification Search
CPC ...... B23K 9/328; B23K 9/095; B23K 9/1043; B23K 9/125; B23K 9/133
See application file for complete search history.

(56) References Cited

U.S. PATENT DOCUMENTS

| 3,689,734 A | 9/1972 | Burley et al. |
| 4,443,687 A | 4/1984 | Toth |

(Continued)

FOREIGN PATENT DOCUMENTS

| CN | 1033448 | 6/1989 |
| CN | 101327542 | 12/2008 |

(Continued)

OTHER PUBLICATIONS

European Patent Office, "Extended Search Report," issued in connection with European Patent Application No. 20167137.7, mailed Oct. 5, 2020, 5 pages.

*Primary Examiner* — Brian W Jennison
(74) *Attorney, Agent, or Firm* — McAndrews, Held & Malloy, Ltd.

(57) ABSTRACT

Systems and methods for cleaning a wire electrode after a welding process has ended are described. During a welding process, a wire electrode may be fed forward from a wire feeder through a welding torch to create a molten weld pool. While, conventionally, feeding of the wire electrode stops when the welding process ends, the present disclosure contemplates instead continuing to feed the wire electrode forward after the welding process ends. More particularly, the present disclosure contemplates feeding the wire electrode into the weld pool so that the wire electrode can be "cleaned" in the molten weld pool created by the welding process. The "cleaned" wire electrode end can be more easily used to establish an electrical arc at the beginning of the next welding process.

20 Claims, 6 Drawing Sheets

(51) Int. Cl.
*B23K 9/10* (2006.01)
*B23K 9/12* (2006.01)
*B23K 9/133* (2006.01)

(56) References Cited

U.S. PATENT DOCUMENTS

| | | | |
|---|---|---|---|
| 4,697,062 | A | 9/1987 | Awano et al. |
| 4,780,594 | A | 10/1988 | Rothermel |
| 5,412,175 | A | 5/1995 | Shimogama |
| 6,023,046 | A | 2/2000 | Holverson et al. |
| 2016/0221105 | A1* | 8/2016 | Henry ................ B23K 9/173 |
| 2018/0093342 | A1* | 4/2018 | Davidson ............ B23K 9/125 |

FOREIGN PATENT DOCUMENTS

| CN | 107775150 | 3/2018 |
|---|---|---|
| EP | 2402105 | 1/2012 |
| JP | 2016074012 | 5/2016 |

\* cited by examiner

SYSTEMS AND METHODS FOR AUTOMATED CLEANING OF WIRE ELECTRODES AFTER WELDING

CROSS REFERENCE TO RELATED APPLICATIONS

This application is a continuation of, and claims priority to, co-pending U.S. patent application Ser. No. 16/399,347, filed Apr. 30, 2019, entitled "SYSTEMS AND METHODS FOR AUTOMATED CLEANING OF WIRE ELECTRODES AFTER WELDING" the entirety of which is hereby incorporated by reference.

TECHNICAL FIELD

The present disclosure generally relates to welding systems and, more particularly, to systems and methods for automated cleaning of wire electrodes after welding.

BACKGROUND

One of the first steps of a welding process is establishing an electrical arc between a welding gun and a workpiece. Some arc welding systems use wire electrodes fed to the welding gun to establish the electrical arc. It is easier to establish the electrical arc with the wire electrode if the wire electrode is "clean." However, the wire electrode has a tendency to become "unclean" (e.g., with a molten ball or other welding residue adhered to the end) during the welding process. It is more difficult to establish the electrical arc if the wire electrode is "unclean."

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for automated cleaning of wire electrodes after welding, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Some examples of the present disclosure relate to the automated cleaning of wire electrodes after a welding process has finished. In some examples, ensuring a welding electrode is consistently "clean" after a welding process has finished may make it easier to establish an electrical arc at the beginning of the next welding process. However, the wire electrode has a tendency to become "unclean" during the welding process.

Some attempts have been made to clean the wire electrode after the welding process has finished. For example, some operators may manually cut off the end of the wire after the welding process has finished, in order to remove any residue that may have collected there. However, this solution relies on the good memory and proactive nature of an operator. As another example, some welding systems may automatically provide a high current to the wire electrode after the welding process has finished to "spray" any remaining welding residue off the end of the wire electrode. However, spraying can produce undesirable side effects (e.g., high energy effect due to non-ideal shielding gas).

The present disclosure contemplates cleaning the wire electrode in a molten weld pool created during the welding process. While, conventionally, feeding of the wire electrode stops when the welding process ends, the present disclosure contemplates instead continuing to feed the wire electrode forward into the weld pool immediately after the welding process has finished. The weld pool created during the welding process is likely to still be molten immediately after welding. Further, it has been observed that a molten weld pool can "clean" the wire electrode by melting and/or removing residual welding material submerged (and/or "wet") in the weld pool. After being submerged for a sufficient amount of time, the (now cleaned) wire electrode may be retracted from the weld pool. After cleaning, the wire electrode may be more easily used to establish an electrical arc at the beginning of the next welding process.

Figure 1:
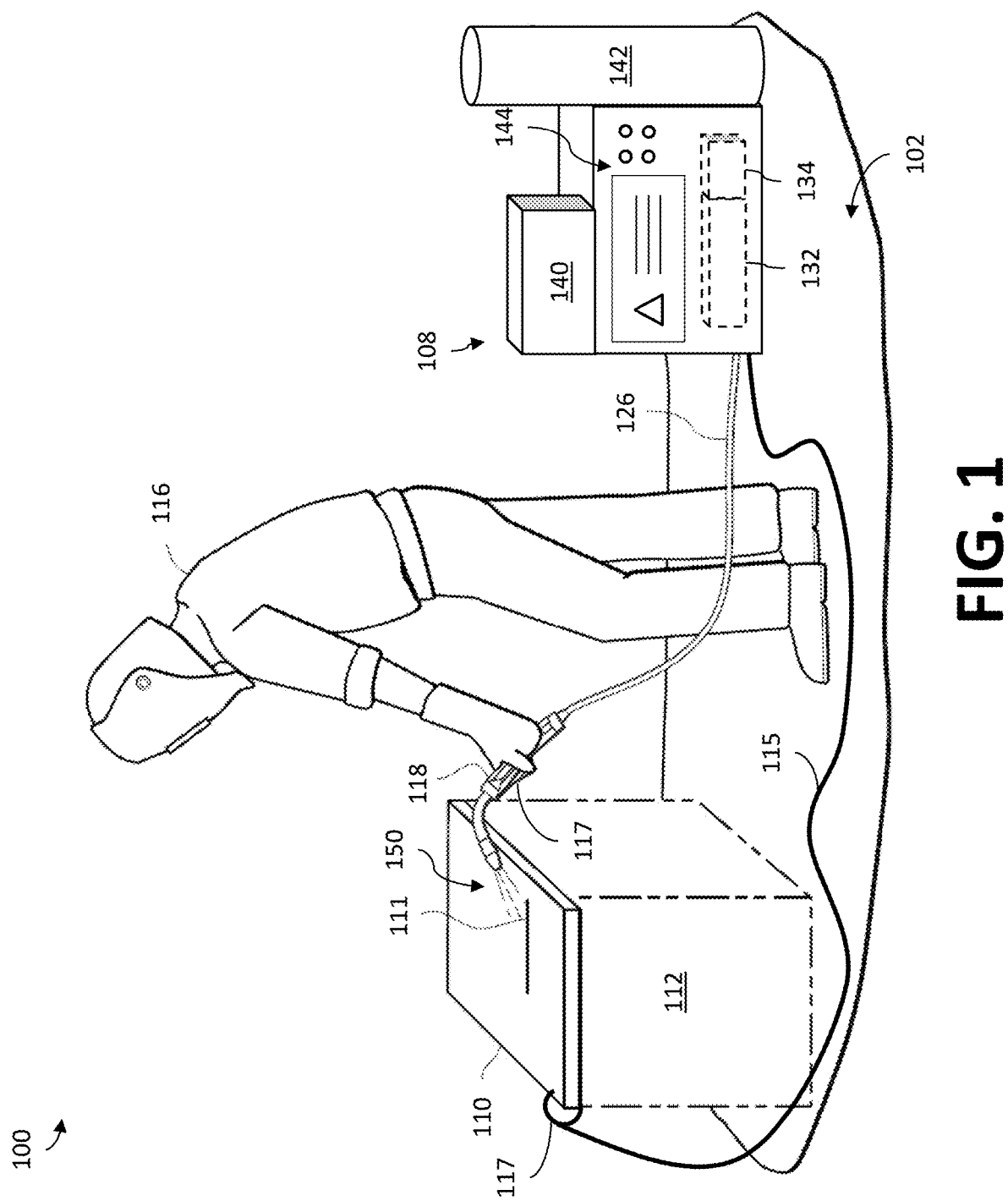
FIG. 1 is a perspective view of an operator using an example welding system, in accordance with aspects of this disclosure.
Figure 2:
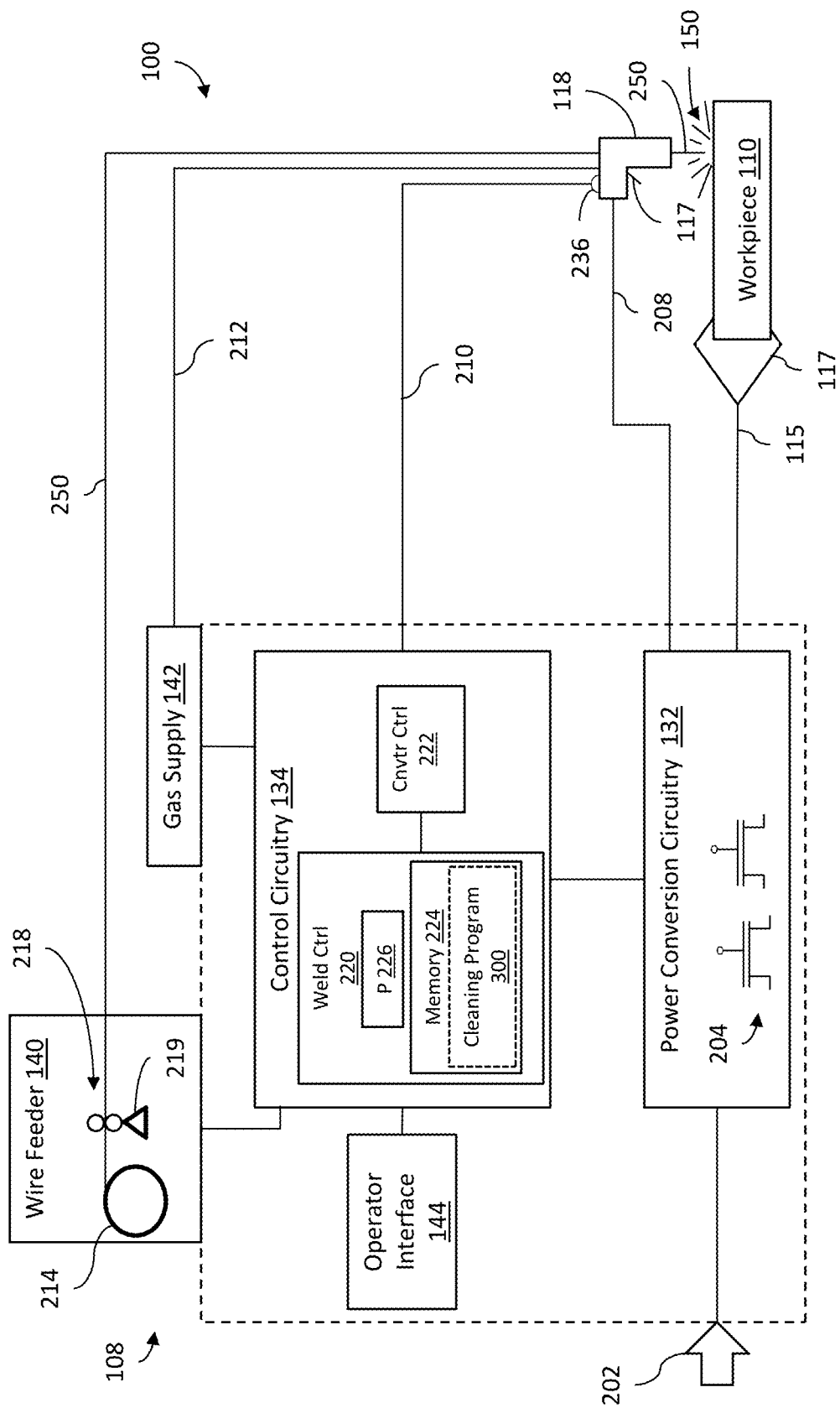
FIG. 2 is a block diagram illustrating components of the example welding system of FIG. 1, in accordance with aspects of this disclosure.

FIGS. 1 and 2 show an example perspective and block diagram view, respectively, of a welding system 100. In the example of FIG. 1, the welding system 100 includes a welding torch 118 and work clamp 117 coupled to a welding-type power supply 108 within a welding cell 102. In the example of FIG. 1, the welding torch 118 is coupled to the welding-type power supply 108 via a welding cable 126, while the clamp 117 is coupled to the welding-type power supply 108 via a clamp cable 115. In the example of FIG. 1, an operator 116 is handling the welding torch 118 near a welding bench 112 that supports a workpiece 110 coupled to the work clamp 117. While only one workpiece 110 is shown in the examples of FIGS. 1 and 2, in some examples there may be several workpieces 110. While a human operator 116 is shown in FIG. 1, in some examples, the operator 116 may be a robot and/or automated welding machine.

In the example of FIG. 1, the welding torch 118 is a welding gun configured for gas metal arc welding (GMAW). In some examples, the welding torch 118 may comprise a gun configured for flux-cored arc welding (FCAW). In the examples of FIGS. 1 and 2, the welding torch 118 includes a trigger 119. In some examples, the trigger 119 may be activated by the operator 116 to trigger a welding-type operation (e.g., an arc welding process).

In the example of FIGS. 1 and 2, the welding-type power supply 108 includes (and/or is coupled to) a wire feeder 140. In the example of FIG. 2, the wire feeder 140 houses a wire spool 214 that is used to provide the welding torch 118 with a wire electrode 250 (e.g., solid wire, cored wire, coated wire). In the example of FIG. 2, the wire feeder 140 further includes rollers 218 configured to feed the wire electrode 250 to the torch 118 (e.g., from the spool 214) and/or retract the wire electrode 250 from the torch 118 (e.g., back to the spool 214). As shown, the wire feeder 140 further includes a motor 219 configured to turn one or more of the rollers 218, so as to feed (and/or retract) the wire electrode 250. In some examples, the welding system 100 may be a push/pull system, and the welding torch 118 may also include one or more rollers 218 and/or motors 219 configured to feed and/or retract the wire electrode 250. While, in the example of FIG. 2, the wire electrode 250 is depicted as being fed from the wire feeder 140 to the welding torch 118 in isolation, in some examples the wire electrode 250 may be routed through the welding cable 126 shown in FIG. 1 with other components of the welding system 100 (e.g., gas, power, etc.).

In the example of FIGS. 1 and 2, the welding-type power supply 108 also includes (and/or is coupled to) a gas supply 142. In the example of FIG. 2, the gas supply 142 is connected to the welding torch 118 through line 212. In some examples, the gas supply 142 supplies a shielding gas and/or shielding gas mixtures to the welding torch 118 (e.g., via line 212). A shielding gas, as used herein, may refer to any gas (e.g., CO2, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). While depicted as its own line 212 in the example of FIG. 2, in some examples the line 212 may be incorporated into the welding cable 126 shown in FIG. 1.

In the example of FIGS. 1 and 2, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator interface 144 may comprise a remote control and/or pendant. In some examples, the operator 116 may use the operator interface 144 to enter and/or select one or more weld parameters (e.g., voltage, current, gas type, wire feed speed, workpiece material type, filler type, etc.) and/or weld operations for the welding-type power supply 108. In some examples, the weld parameters and/or weld operations may be stored in a memory 224 of the welding-type power supply 108 and/or in some external memory. The welding-type power supply 108 may then control (e.g., via control circuitry 134) its operation according to the weld parameters and/or weld operations. In some examples (e.g., where the operator is a robot and/or automated welding machine), the operator interface 144 may be used to start and/or stop a welding process. In some examples, the operator interface 144 may further include one or more receptacles configured for connection to (and/or reception of) one or more external memory devices (e.g., floppy disks, compact discs, digital video disc, flash drive, etc.). In the example of FIG. 2, the operator interface 144 is communicatively coupled to control circuitry 134 of the welding-type power supply 108, and may communicate with the control circuitry 134 via this coupling.

In the example of FIGS. 1 and 2, the welding-type power supply 108 is configured to receive input power (e.g., from AC mains power, an engine/generator, a solar generator, batteries, fuel cells, etc.), and convert the input power to DC (and/or AC) output power (e.g., welding-type output power). In the example of FIG. 2, the input power is indicated by arrow 202. In the example of FIG. 1, the output power may be provided to the welding torch 118 via welding cable 126. In the example of FIG. 2, the output power may be provided to the welding torch 118 via line 208. While depicted as its own line 208 in the example of FIG. 2 for ease of explanation, in some examples the line 208 may be part the welding cable 126 shown in FIG. 1. In the example of FIGS. 1 and 2, the output power may be provided to the clamp 117 (and/or workpiece(s) 110) via clamp cable 115.

In the example of FIGS. 1 and 2, the welding-type power supply 108 includes power conversion circuitry 132 configured to convert the input power to output power (e.g., welding-type output power and/or other power). In some examples, the power conversion circuitry 132 may include circuit elements (e.g., transformers, rectifiers, capacitors, inductors, diodes, transistors, switches, and so forth) capable of converting the input power to output power. In the example of FIG. 2, the power conversion circuitry 132 includes one or more controllable circuit elements 204. In some examples, the controllable circuit elements 204 may comprise circuitry configured to change states (e.g., fire, turn on/off, close/open, etc.) based on one or more control signals. In some examples, the state(s) of the controllable circuit elements 204 may impact the operation of the power conversion circuitry 132, and/or impact characteristics (e.g., current/voltage magnitude, frequency, waveform, etc.) of the output power provided by the power conversion circuitry 132. In some examples, the controllable circuit elements 204 may comprise, for example, switches, relays, transistors, etc. In examples where the controllable circuit elements 204 comprise transistors, the transistors may comprise any suitable transistors, such as, for example MOSFETs, JFETs, IGBTs, BJTs, etc.

In some examples, the controllable circuit elements 204 of the power conversion circuitry 132 may be controlled by (and/or receive control signals from) control circuitry 134 of the welding-type power supply 108. In the examples of FIG. 2, the welding-type power supply 108 includes control circuitry 134 electrically coupled to the power conversion circuitry 132. In some examples, the control circuitry 134 operates to control the power conversion circuitry 132, so as to ensure the power conversion circuitry 132 generates the appropriate welding-type power for carrying out the desired welding-type operation.

In the example of FIG. 2, the control circuitry 134 includes a weld controller 220 and a converter controller 222. As shown the weld controller 220 and converter controller 222 are electrically connected. In some examples, the converter controller 222 controls the power conversion circuitry 132 (e.g., via the controllable circuit elements 204), while the weld controller 220 controls the converter controller 222 (e.g., via one or more control signals). In some examples, the weld controller 220 may control the converter controller 222 based on weld parameters and/or weld operations input by the operator (e.g., via the operator interface 144) and/or input programmatically. For example, an operator may input one or more target weld operations and/or weld parameters through the operator interface 144, and the weld controller 220 may control the converter controller 222 based on the target weld operations and/or weld parameters. The converter controller 222 may in turn control the power conversion circuitry 132 (e.g., via the controllable circuit elements 204) to produce output power in line with the weld operations and/or weld parameters. In some examples, the converter controller 222 may only send control signals to the power conversion circuitry 132 if an enable signal is provided by the weld controller 220 (and/or if the enable signal is set to true, on, high, 1, etc.).

In the example of FIG. 2, the weld controller 220 includes memory 224 and one or more processors 226. In some examples, the one or more processors 226 may use data stored in the memory 224 to execute certain control algorithms. The data stored in the memory 224 may be received via the operator interface 144, one or more input/output ports, a network connection, and/or be preloaded prior to assembly of the control circuitry 134. In the example of FIG. 2, the memory 224 further comprises a wire cleaning program 300, further discussed below. In some examples, the wire cleaning program 300 may make use of the processors 226 and/or memory 224. Though not depicted, in some examples the converter controller 222 may also include memory and/or one or more processors.

In the example of FIG. 2, the control circuitry 134 is in electrical communication with one or more sensors 236 via line 210. While shown as a separate line for ease of explanation in the example of FIG. 2, in some examples, line 210 may be integrated into the weld cable 126 of FIG. 1. In some examples, the control circuitry 134 may use the one or more sensors 236 to monitor the current and/or voltage of the output power and/or welding arc 150. In some examples the one or more sensors 236 may be positioned on, within, along, and/or proximate to the wire feeder 140, weld cable 126, power supply 108, and/or torch 118. In some examples, the one or more sensors 236 may comprise, for example, current sensors, voltage sensors, impedance sensors, temperature sensors, acoustic sensors, trigger sensors, position sensors, angle sensors, and/or other appropriate sensors. In some examples, the control circuitry 134 may determine and/or control the power conversion circuitry 132 to produce an appropriate output power, arc length, and/or extension of wire electrode 250 based at least in part on feedback from the sensors 236.

In the example of FIG. 2, the control circuitry 134 is also in electrical communication with the wire feeder 140 and gas supply 142. In some examples, the control circuitry 134 may control the wire feeder 140 to output wire electrode 250 at a target speed and/or direction. For example, the control circuitry 134 may control the motor 219 of the wire feeder 140 to feed the wire electrode 250 to (and/or retract the wire electrode 250 from) the torch 118 at a target speed. In some examples, the control circuitry 134 may also control one or more motors 219 and/or rollers 218 within the welding torch 118 to feed and/or retract the wire electrode 250. In some examples, the welding-type power supply 108 may control the gas supply 142 to output a target type and/or amount gas. For example, the control circuitry 134 may control a valve in communication with the gas supply 142 to regulate the gas delivered to the welding torch 118.

In some examples, a welding process may be initiated when the operator 116 activates the trigger 119 of the welding torch 118 (and/or otherwise activates the welding torch 118). During the welding process, the welding-type power provided by the welding-type power supply 108 may be applied to the wire electrode 250 fed through the welding torch 118 in order to produce a welding arc 150 between the wire electrode 250 and the one or more workpieces 110. The arc 150 may complete a circuit formed through electrical coupling of both the welding torch 118 and workpiece 110 to the welding-type power supply 108. The heat of the arc 150 may melt portions of the wire electrode 250 and/or workpiece 110, thereby creating a molten weld pool. Movement of the welding torch 118 (e.g., by the operator) may move the weld pool, creating one or more welds 111.

When the welding process is finished, the operator 116 may release the trigger 119 (and/or otherwise deactivate the welding torch 118). In some examples, the control circuitry 134 (e.g., the weld controller 220) may detect that the welding process has finished. For example, the control circuitry 134 may detect a trigger release signal via sensor 236. As another example, the control circuitry 134 may receive a torch deactivation command via the operator interface 144 (e.g., where the torch 118 is maneuvered by a robot and/or automated welding machine).

Figure 4A:
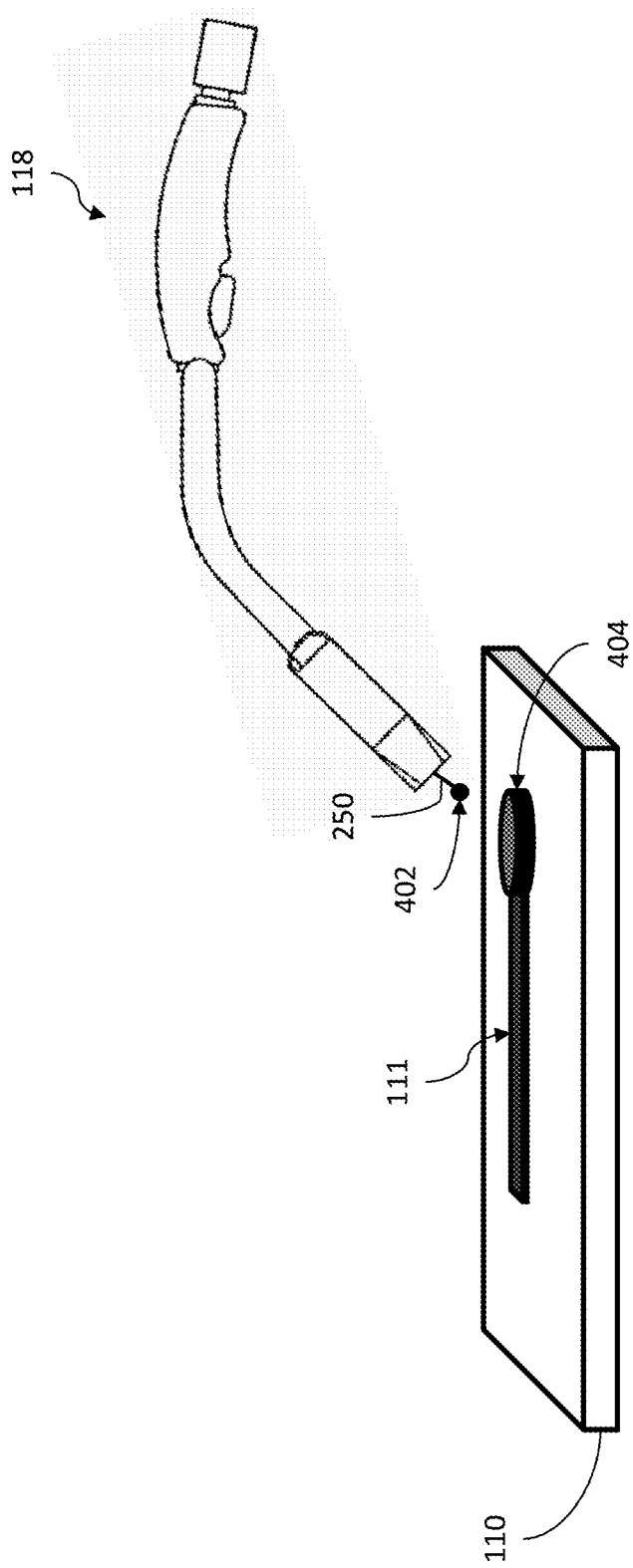
FIGS. 4a-4c are perspective views illustrating an example cleaning of a wire electrode using the wire cleaning process of FIG. 3, in accordance with aspects of this disclosure.

In some examples, welding residue may collect at an end of the wire electrode 250 during the welding process. FIG. 4a shows an example depiction of the welding torch 118 and workpiece 110 immediately after the welding process has finished. In the example of FIG. 4a, the weld 111 has been formed by the welding process, but the final portion of the weld 111 has yet to cool and is still a molten weld pool 404. Because the welding process has just finished, the welding torch 118 remains aimed at the weld pool 404. As shown, a ball 402 of welding residue has collected at the end of the wire electrode 250.

In conventional welding systems, the control circuitry 134 might command the wire feeder 140 to stop feeding the wire electrode 250 after detecting that the welding process has finished. However, in the welding system 100 of the present disclosure, the control circuitry 134 may instead activate the wire cleaning program 300 in response to detecting the welding process has finished, in order to "clean" any residual welding residue off the wire electrode 250. In some examples, some or all of the wire cleaning program 300 may be implemented in machine readable instructions stored in memory 224 and/or executed by the one or more processors 226. In some examples, some or all of the wire cleaning program 300 may be implemented in analog and/or discrete circuitry. In some examples, the wire cleaning program 300 may be configured to feed the wire electrode 250 into the molten weld pool 404 created by the welding process in order to "clean" any residual welding residue (e.g., ball 402) off the wire electrode 250.

Figure 3:
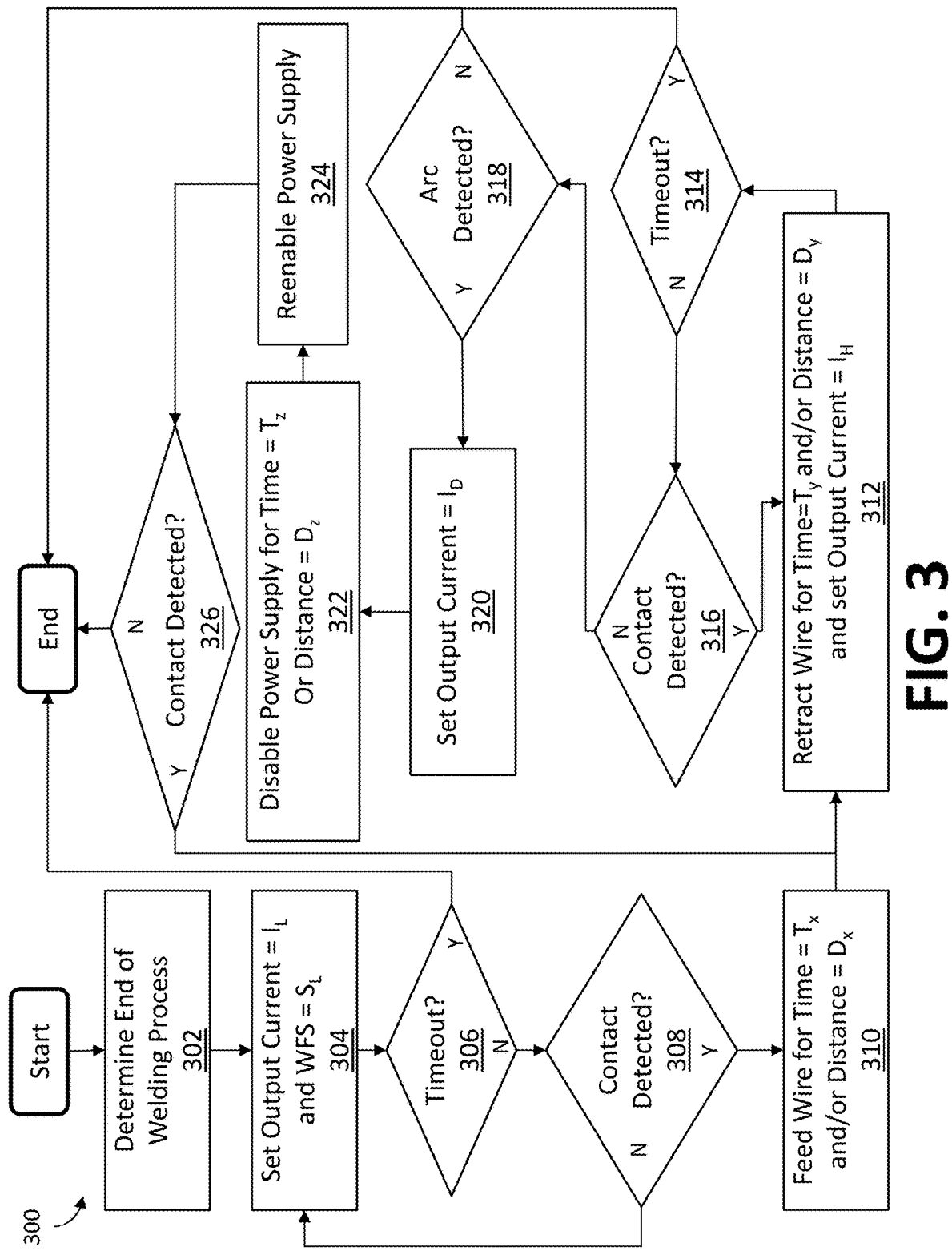
FIG. 3 is a flowchart illustrating an example wire cleaning program, in accordance with aspects of this disclosure.

FIG. 3 is a flowchart representative of the program 300. As shown, the program 300 begins at block 302. At block 302, the program 300 determines that the welding process has finished. In some examples, the program 300 may determine that the welding process has finished via detection by the control circuitry 134 (e.g., the weld controller 220). In some examples, the control circuitry 134 may detect that the welding process has finished by way of a trigger release signal from sensor 236. In some examples, the control circuitry 134 may detect that the welding process has finished via a signal sent through the connection (e.g., via weld cable 126) between the welding torch 118 and the welding-type power supply 108. For example, a signal (and/or change in voltage and/or current) may be detected by the control circuitry 134, such as when the trigger 119 is activated and/or deactivated. In some examples, activating the trigger 119 may open or close a trigger circuit (not shown) in the welding torch 118, while deactivating the trigger 119 may do the opposite. In some examples, the control circuitry 134 may detect that the welding process has finished via a signal detected from the operator interface 144. For example, in examples where the torch 118 is maneuvered by a robot and/or automated welding machine, a human may terminate a welding process via the operator interface 144, and the operator interface 144 may send a corresponding signal to the control circuitry 134. In some examples, the welding process may be programmatically controlled (e.g., via instructions stored in memory 224 and/or executed by processor(s) 226), and the termination of the welding process may be indicated to the control circuitry 134 (e.g., via an appropriate signal) by the program. While block 302 is shown as part of the program 300 in FIG. 3 for the sake of completeness, in some examples, block 302 may be the impetus for executing program 300, rather than being part of program 300.

In some examples, an operator perceptible notification (e.g., text message, graphical depiction, audio message, sound, tone, alarm, etc.) may be outputted via the operator interface 144 at block 302 (and/or when the wire cleaning program 300 is executed). The operator perceptible notification may, for example, indicate to the operator 116 and/or other individual that the wire cleaning program 300 is executing, and to keep the welding torch 118 aimed at the weld pool 404 while the wire cleaning program 300 is executing. This may help reduce the occurrence of errors in the wire cleaning program 300.

As shown, the program 300 proceeds to block 304 after block 302. At block 304, the program 300 commands an output current of $I_L$ (e.g., via one or more signals to the converter controller 222), and commands a forward wire feed speed of $S_L$ (e.g., via one or more signals to the wire feeder 140 and/or welding torch 118). In some examples, $S_L$ may be a relatively low wire feed speed, such as, for example, 50, 75, or 100 inches per minute. In some examples, $I_L$ may be dependent upon the type and/or size of the wire electrode 250. In some examples, $I_L$ may be a relatively low current, such as, for example, 5, 10, or 25 amps for a 0.052 inch diameter metal core wire electrode 250. In some examples, $I_L$ and/or $S_L$ may be stored in memory 224 and/or provided via the operator interface 144. The current $I_L$ may be set low enough to prevent another arc 150 and/or significant melting of the wire electrode 250, but still high enough to detect a short circuit.

In the example of FIG. 3, the program 300 proceeds to block 306 after block 304. At block 306, the program 300 checks if there has been a timeout. In some examples, the timeout check at block 306 may reference a threshold time entered via the operator interface 144, stored in memory 224, and/or otherwise provided by control circuitry 134. In some examples, the timeout check at block 306 may further reference a clock and/or a timer of the control circuitry 134. In the example of FIG. 3, the program 300 ends if the threshold amount of time has passed since block 304. This may prevent continuous running of the program 300 and/or feeding the wire electrode 250, such as in situations where, for example, there is some error, or the torch 118 is not pointed at the weld pool 402 for some reason. If, however, the threshold amount of time has not passed, the program 300 proceeds to block 308.

In the example of FIG. 3, the program 300 determines if there is contact between the wire electrode 250 and weld pool 404 (and/or workpiece(s) 110) at block 308. In some examples, the program 300 may determine there is contact if a short circuit is detected (e.g., if sensor(s) 236 detect a current magnitude at or near $I_L$ and a zero or negligible voltage). In some examples, the program may determine there has been contact through some other means (e.g., via a camera, thermal imaging device, spectrometer, spectrophotometer, etc.). If the program 300 determines no contact, the program 300 returns to block 304, as shown. If the program 300 determines that contact has been made, the program 300 proceeds to block 310.

At block 310, the program 300 commands (e.g., via one or more signals) the wire feeder 140 (and/or torch 118) to continue feeding the wire electrode 250 forward into the weld pool 404 for a time $T_x$ and/or a distance $D_x$. In some examples, this continued feeding of the wire electrode 250 may ensure that any weld residue (e.g., ball 402) at the end of the wire electrode 250 is sufficiently "wet" by (and/or submerged into) the weld pool 404 to be cleaned off. In some examples, the time $T_x$ and/or distance $D_x$ may be stored in memory 224 and/or set by an operator (e.g., via the operator interface 144). In some examples, the program 300 may use the same wire feed speed $S_L$ set at block 304, or a different wire feed speed. In some examples, the program 300 may instead command the wire feeder 140 (and/or torch 118) to pause or stop feeding of the wire electrode 250 for time $T_x$ at block 310.

Figure 4B:
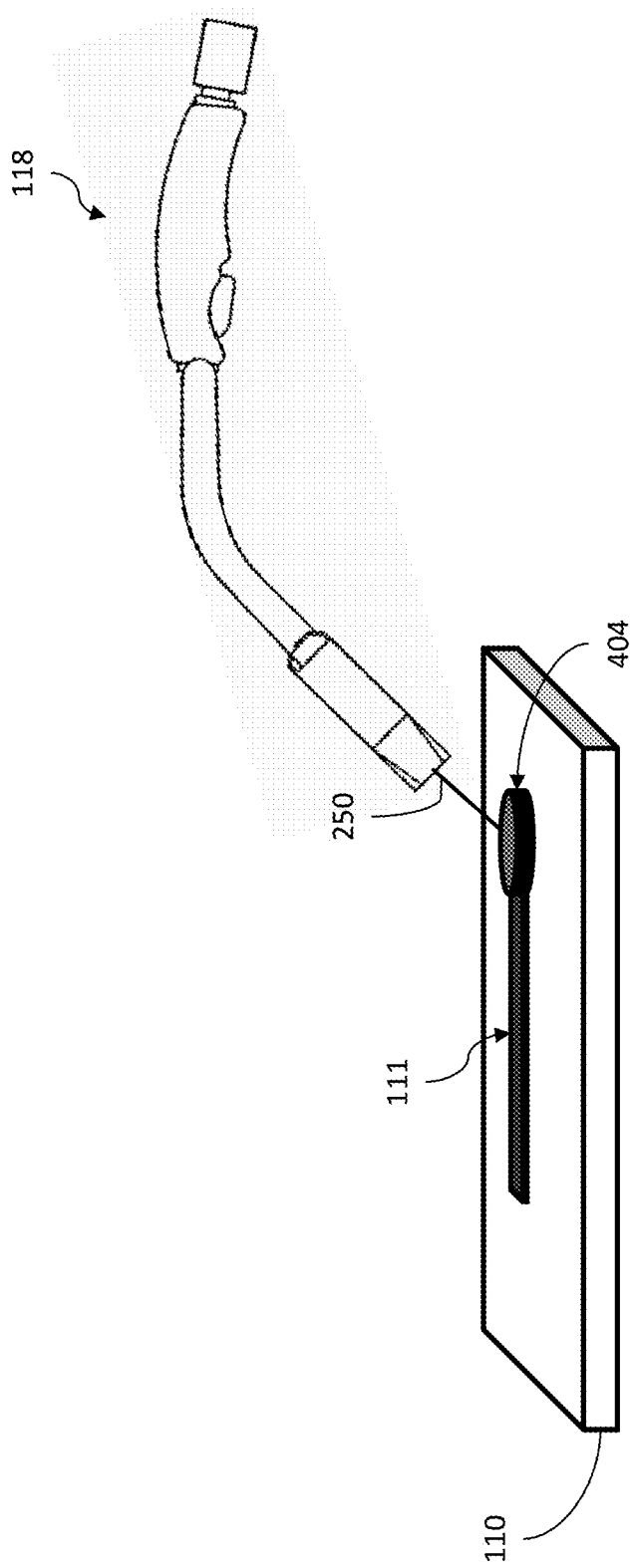

FIG. 4b shows an example depiction of the welding torch 118 and workpiece 110 after the wire electrode 250 has been fed forward into the weld pool 404. As shown, good contact is being made between the wire electrode 250 and the weld pool 404 (and workpiece(s) 110, via weld pool 404). In the example of FIG. 4b, the wire electrode 250 has been fed forward past initial contact with the weld pool 404, to the point where the ball 402 has been completely submerged into the weld pool 404.

In the example of FIG. 3, the program 300 proceeds to block 312 after the expiration of time $T_x$ and/or distance $D_x$ of block 310. At block 312, the program 300 commands (e.g., via one or more signals) the wire feeder 140 (and/or welding torch 118) to retract the wire electrode 250 from the weld pool 404 for a time $T_y$ and/or a distance $D_y$. In some examples, the time $T_y$ and/or distance $D_y$ may be stored in memory 224 and/or set by an operator (e.g., via the operator interface 144). In some examples, the time $T_y$ and/or distance $D_y$ may be the same as, greater than, or less than the time $T_x$ and/or distance $D_x$. In some examples, the program 300 may use the same wire feed speed $S_L$ set at block 304, the wire feed speed set at block 310, and/or a different wire feed speed.

As shown, the program 300 also commands (e.g., via one or more signals) the output current to a magnitude $I_H$ at block 312. In some examples, the current magnitude $I_H$ may be stored in memory 224 and/or set by an operator (e.g., via the operator interface 144). In some examples, the current magnitude $I_H$ may be higher than the prior magnitude $I_L$ set at block 304. In some examples, the current magnitude $I_H$ may be set at a level that keeps the wire electrode 250 relatively warm, to prevent the wire electrode 250 from cooling and becoming "frozen" (and/or stuck) to the weld pool 404 during retraction. In some examples, $I_H$ may be dependent upon a type and/or size of the wire electrode 250. For example, for a 0.052 inch diameter metal core wire electrode 250, $I_H$ may be 50, 75, or 100 amps.

In the example of FIG. 3, the program 300 proceeds to block 314 after block 312. At block 314, the program 300 checks if there has been a timeout. In some examples, the timeout check at block 314 may reference a threshold time entered via the operator interface 144, stored in memory 224, and/or otherwise provided by control circuitry 134. In some examples, the threshold time of block 314 may be the same as, greater than, or less than the threshold time of block 306. In some examples, the timeout check at block 314 may further reference a clock and/or a timer of the control circuitry 134. In the example of FIG. 3, the program 300 ends if the threshold amount of time has passed since block 312. This may prevent continuous running of the program 300 and/or retraction the wire electrode 250, such as in situations where, for example, there is some error. If, however, the threshold amount of time has not passed, the program 300 proceeds to block 316.

At block 316, the program 300 determines whether the wire electrode 250 is still in contact with the weld pool 404 (and/or workpiece 110) or if contact has ceased. In some examples, the program 300 may determine there is contact if a short circuit is detected (e.g., if sensor 236 detects the $I_H$ current and an approximately zero voltage). In some examples, the program 300 may determine that there is no contact (and/or a cessation of contact) if an open circuit is detected (e.g., if sensor 236 detects no or negligible current and a substantial voltage). In some examples, the program may determine whether there is contact through some other means (e.g., via a camera, thermal imaging device, spectrometer, spectrophotometer, etc.). As shown, if contact is still detected at block 316, the program 300 returns to block 312. In some examples, if contact is still detected at block 316, the program 300 may return to block 310. If no contact is detected at block 316 in the example of FIG. 3, the program 300 concludes that the wire electrode 250 has been successfully retracted out of the weld pool 404 and proceeds to block 318.

Figure 4C:
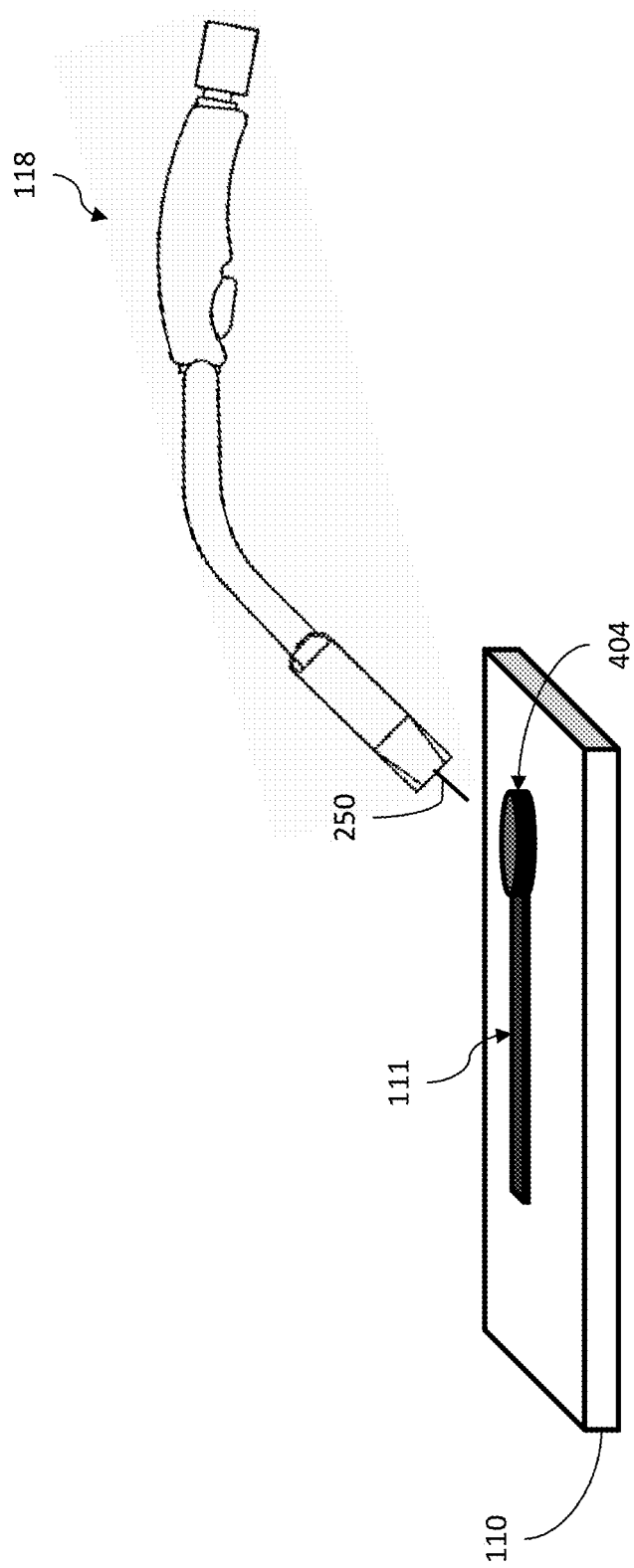

FIG. 4c shows an example depiction of the welding torch 118 and workpiece 110 after the wire electrode 250 has been retracted from the weld pool 404. As shown, the wire electrode 250 is no longer in contact with the weld pool 404 (and/or workpiece(s) 110). In the example of FIG. 4c, the ball 402 has been cleaned off the wire electrode 250 by the weld pool 404. After this cleaning, the wire electrode 250 is ready to be used in the next welding process.

In the example of FIG. 3, the program 300 checks whether there is an electrical arc 150 between the wire electrode 250 and the workpiece 110 at block 318. This check may be necessary in some examples in case the current magnitude $I_H$ set at block 312 results in a high enough voltage to create an arc after the wire electrode 250 is retracted away from contact with the weld pool 404 (and/or workpiece 110). As the welding process is supposed to be over during the program 300, a new welding arc 150 may be undesirable. In some examples, the program 300 may use the sensor(s) 236 to determine whether there is an arc 150. For example, the sensor(s) 236 may detect both a non-trivial current and voltage if there is an arc 150. If no welding arc 150 is detected at block 318, the program 300 ends. However, if a welding arc 150 is detected at block 318, the program proceeds to block 320. In some examples, the arc check at block 318 may be skipped, and the program 300 may always proceed to block 320 (e.g., out of an abundance of caution).

At block 320, the program 300 commands (e.g., via one or more signals) an output current magnitude of $I_D$. In some examples, $I_D$ may be dependent upon a type and/or size of the wire electrode 250. In some examples, the current magnitude $I_D$ may be less than or equal to 5, 10, or 25 amps for a 0.052 inch diameter metal core wire electrode 250. In some examples, the program 300 sets the output current magnitude to $I_D$ at block 320 in order to ensure that the power supply 108 will be outputting a known (and/or low) current magnitude when it is re-enabled at block 324, rather than, for example, a higher current that may produce another arc 150 and/or melt the wire electrode 250, which may result in another ball 402 forming. In some examples, the program 300 may skip blocks 322 and 324, and set the output current magnitude $I_D$ to a low enough value that any arc 150 will extinguish itself relatively quickly.

In the example of FIG. 3, the program 300 proceeds to block 322 after block 320. At block 322, the program 300 disables the power supply 108 for a time $T_Z$ and/or a retraction distance $D_Z$ of wire electrode 250. In examples where the power supply 108 is disabled, the program 300 may command (e.g., via one or more signals) the wire feeder 140 (and/or welding torch 118) to retract a distance $D_Z$ of the wire electrode 250. In some examples, the program 300 may disable the power supply 108 by setting the enable signal delivered to the converter controller 222 to off (and/or false, low, 0, etc.). In some examples, the converter controller 222 may only supply control signals to switching elements 204 of the power conversion circuitry 132 when the enable signal is set to on (and/or true, high, 1, etc.). Without the control signals, the switching elements 204 of the power conversion circuitry 132 will not operate (and/or fire), and the power conversion circuitry 132 will be unable to output regulated welding-type power.

In the example of FIG. 3, the program 300 proceeds to block 324 after expiration of the time $T_Z$ and/or a retraction distance $D_Z$ of block 322. At block 324, the program re-enables the power supply 108 (e.g., by setting the enable signal to on). As shown, the program 300 proceeds to block 326 after block 324. At block 326, the program 300 again determines whether the wire electrode 250 is in contact with the weld pool 404 (and/or workpiece(s) 110), such as through any of the methods discussed above. In some examples, the weld pool 404 may grow beyond its previous bounds where there has been an additional arc 150, making this additional check necessary in case the weld pool 404 grows to such an extent that contact is once again made with the wire electrode 250. If the program 300 detects contact, the program 300 returns to block 312. If the program 300 does not detect contact, the program 300 ends.

The wire cleaning program 300 contemplated by the present disclosure allows for a still warm weld pool 404 to "clean" the end of a wire electrode 250 after a welding process has finished. This "cleaning" can facilitate easier establishment of a welding arc 150 at the beginning of the next welding process. Additionally, the method of "cleaning" avoids the "spraying" of prior weld stoppage cleaning programs.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor 130.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power and/or welding-type output power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:
1. A welding system, comprising:
a welding-type power supply configured to provide power to a welding torch, the welding torch configured to provide the power to a welding wire fed from a wire feeder to establish an electrical arc between the welding wire and a workpiece, the welding-type power supply comprising control circuitry configured to:
  detect an end of a welding process,
  in response to detecting the end of the welding process, output a signal to the wire feeder to feed the welding wire forward,
  detect a contact between the welding wire and the workpiece,
  in response to detecting the contact, output a signal to the wire feeder to feed the welding wire forward for a first time period or first distance, or output a signal to the wire feeder to stop feeding the welding wire forward for the first time period, and
  in response to the first time period or first distance expiring, retract the welding wire.

2. The welding system of claim 1, wherein the arc creates a molten weld pool during the welding process, the control circuitry being configured to, in response to detecting the end of the welding process, output the signal to the wire feeder to feed the welding wire forward into the molten weld pool so that the molten weld pool can clean residue accumulated during the welding process off on an end of the welding wire.

3. The welding system of claim 1, wherein the control circuitry is further configured to output a signal to control a current magnitude of the power to a magnitude above zero in response to detecting the end of the welding process.

4. The welding system of claim 1, wherein detecting the contact between the welding wire and the workpiece comprises detecting a short circuit formed by the contact between the welding wire and the workpiece.

5. The welding system of claim 1, wherein the control circuitry is further configured to:
  detect a cessation of the contact between the welding wire and the workpiece, and
  in response to detecting the cessation of contact, decrease the current magnitude for a second time period or until a second distance of welding wire has been retracted.

6. The welding system of claim 5, wherein detecting the cessation of contact between the welding wire and the workpiece comprises detecting an increase in voltage corresponding to cessation of a short circuit.

7. The welding system of claim 1, wherein detecting the end of the welding process comprises detecting a trigger release of the welding torch, detecting a torch deactivation command entered via an operator interface, or detecting a termination signal of a welding program.

8. A method for wire cleaning after a welding process has finished, comprising:
  detecting an end of the welding process using control circuitry of a welding-type power supply;
  in response to detecting the end of the welding process, feeding a welding wire forward toward a workpiece;
  detecting a contact between the welding wire and the workpiece using the control circuitry of the welding-type power supply;
  in response to detecting the contact between the welding wire and the workpiece, continuing feeding of the welding wire forward towards the workpiece for a first time period or first distance, or stopping feeding of the welding wire forward towards the workpiece for the first time period; and
  in response to expiration of the first time period or first distance, retracting the welding wire.

9. The method of claim 8, wherein feeding the welding wire forward comprises sending a feed signal from the control circuitry of the welding-type power supply to a wire feeder, the feed signal being representative of a command to feed the welding wire forward.

10. The method of claim 9, wherein an arc generated during the welding process creates a molten weld pool on the workpiece, and feeding the welding wire forward toward the workpiece comprises feeding the welding wire forward into the molten weld pool so that the molten weld pool can clean residue accumulated during the welding process off on an end of the welding wire.

11. The method of claim 8, further comprising decreasing a magnitude of a welding current to a value above zero in response to detecting the end of the welding process, the welding current being provided by the welding-type power supply to a welding torch.

12. The method of claim 8, wherein detecting the contact between the welding wire and the workpiece comprises detecting a short circuit formed by the contact between the welding wire and the workpiece.

13. The method of claim 8, further comprising:
  detecting a cessation of the contact between the welding wire and the workpiece;
  in response to detecting the cessation of contact, disabling the welding-type power supply from providing power for a second time period or until a second distance of welding wire has been retracted;
  enabling the welding-type power supply to provide power after expiration of the second time period or second distance;
  detecting a second contact between the welding wire and the workpiece; and
  in response to detecting the second contact between the welding wire and the workpiece, retracting the welding wire until a second cessation of contact is detected or a third time period expires.

14. The method of claim 8, wherein detecting the end of the welding process comprises detecting a torch deactivation command entered via an operator interface, detecting a termination signal of a welding program, or detecting a trigger release of a welding torch.

15. A welding-type system, comprising:
  a wire feeder configured to feed welding wire forward from the wire feeder or retract welding wire into the wire feeder;
  a welding torch configured provide the welding wire with power to establish an electrical arc between the welding wire and workpiece;
  a welding-type power supply configured to provide the power to the welding torch, the welding-type power supply comprising control circuitry configured to:
    detect an end of a welding process,
    in response to detecting the end of the welding process, output a signal to the wire feeder to feed the welding wire forward,
    detect a contact between the welding wire and the workpiece,
    in response to detecting the contact, output a signal to the wire feeder to feed the welding wire forward for a first time period or first distance, or output a signal to the wire feeder to stop feeding the welding wire forward for the first time period, and
    in response to the first time period or first distance expiring, retract the welding wire.

16. The system of claim 15, wherein the electrical arc creates a molten weld pool during the welding process, the control circuitry configured being configured to, in response to detecting the end of the welding process, output the signal to the wire feeder to feed the welding wire forward into the molten weld pool so that the molten weld pool can clean residue accumulated during the welding process off on an end of the welding wire.

17. The system of claim 15, wherein the control circuitry is further configured to output a signal to control a current magnitude of the power to a magnitude above zero in response to detecting the end of the welding process.

18. The welding system of claim 15, wherein detecting the contact between the welding wire and the workpiece comprises detecting a short circuit formed by the contact between the welding wire and the workpiece.

19. The system of claim 15, wherein the control circuitry is further configured to:
  detect a cessation of the contact between the welding wire and the workpiece, and
  in response to detecting the cessation of contact, decrease the current magnitude for a second time period or until a second distance of welding wire has been retracted,
  wherein detecting the cessation of contact between the welding wire and the workpiece comprises detecting an increase in voltage corresponding to cessation of the short circuit.

20. The system of claim 15, wherein detecting the end of the welding process comprises detecting a trigger release of the welding torch, detecting a torch deactivation command entered via an operator interface, or detecting a termination signal of a welding program.

* * * * *